United States Patent [19]
Weegen et al.

[11] 3,787,092
[45] Jan. 22, 1974

[54] WHEEL WITH DROP-BASE RIM

[75] Inventors: Lorenz Weegen, Langenfeld; Albrecht Luders, Haan; Heinz Brinkmann, Solingen; Klaus Herbst; Gerd Ernst, both of Solingen-Ohligs, all of Germany

[73] Assignee: Kronprinz Aktiengesellschaft, Solingen-Ohligs, Germany

[22] Filed: Jan. 26, 1972

[21] Appl. No.: 220,794

[30] Foreign Application Priority Data
Feb. 5, 1971 Germany.......... P 21 06 381.0-21

[52] U.S. Cl............................................. 301/63 R
[51] Int. Cl............................................. B60b 3/04
[58] Field of Search...................... 301/63 R, 63 DS

[56] References Cited
UNITED STATES PATENTS
3,102,608  9/1963  Isbell................................ 301/63 R
3,210,126  10/1965  Travers............................. 301/63 R FOREIGN PATENTS OR APPLICATIONS
573,796  3/1958  Italy.................................. 301/63 R
1,918,022  10/1970  Germany........................... 301/63 R Primary Examiner—Richard J. Johnson
Assistant Examiner—Reinhard J. Eisenzopf
Attorney, Agent, or Firm—Smyth, Roston & Pavitt

[57] ABSTRACT

Wheel for vehicles having a rim element and a wheel disk, the rim being of asymmetrical construction with one narrower and one broader side relative to a dropped base, the broader side having a substantially cylindrical portion, the rim element having flanges bent toward the axis of the wheel; the wheel disk having a peripheral portion of cylindrical configuration that extends axially and matches said cylindrical portion in fitting configuration and being welded thereto.

1 Claim, 1 Drawing Figure

PATENTED JAN 22 1974  3,787,092
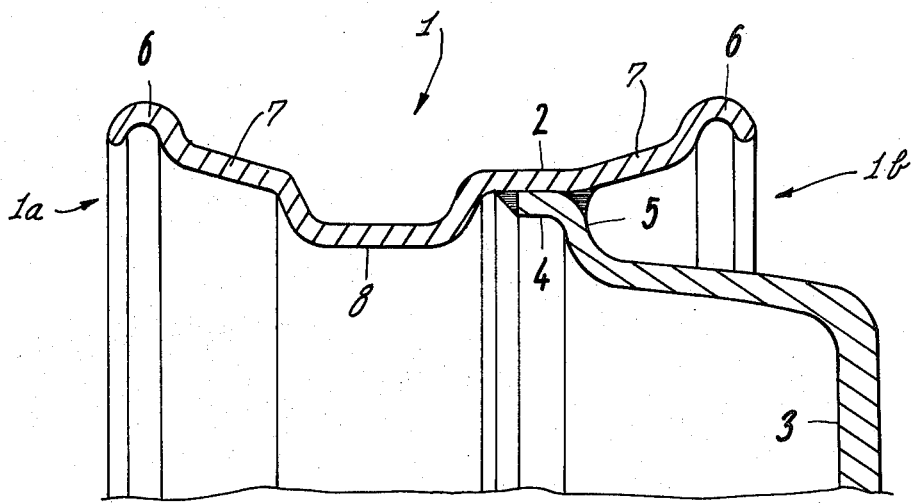

WHEEL WITH DROP-BASE RIM

The present invention relates to a wheel for vehicles, the wheel having asymmetric drop-base rim, particularly of the variety with steep shoulders of low height in cross section; also, a wheel center disk or dish is to be welded to the wider side of the rim, between dropped base and one shoulder thereof.

It is an object of the present invention to improve on wheels of that type, for facilitating centering prior to welding the rim to the wheel disk, so as to obtain improved performance as far as truth of rotation and planarity thereof is concerned. However, as much space as possible should be made available to accommodate breaking equipment. Finally, the endurance and fatigue limit is to be increased as compared with known construction for wheels.

In accordance with the preferred embodiments of the invention, it is suggested to provide for the following combination. The wheel disk has a cylindrical peripheral portion welded to a matching cylindrical transition part of the rim for the wheel, the transition part extending between the depressed or dropped base and one shoulder (seat) of the rim. The rim has flanges that are not quite beaded, but bent toward the wheel axis.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a section through a rim and a wheel disk as interconnected in accordance with the preferred embodiment of the invention.

Proceeding now to the detailed description of the drawing, the FIGURE illustrates a portion of a wheel disk or dish 3 having an cylindrically shaped, peripheral annulus 4. The dish is crimped where merging into the cylindrical periphery, to obtain a stiffening and reinforcing corrugation 5. A drop-base rim 1 of asymmetrical construction as to its well 8 has a transition part 2 at the wider side (1b), which transition annulus is also, at least approximately, cylindrical. The outer surface of cylindrical peripheral part 4 is welded to that transition part 2 as indicated. The rim part 1 has flanges 6 which are not quite beaded but turned back toward the axis of the wheel, by about 100° or more. Reference numeral 7 denotes shoulders as seats for the tire beads.

Tests have shown that the shoulder portions 7, as well as the dropped base or well 8 are subjected to high stress and strain. On the other hand, stress is only small in the transition portion from shoulder radius to shoulder, and there is even a zero stress point. The asymmetric rim element 1 is supported on the narrower side (1a) by the dropped base itself, but is unstable at the broader or wider side of the asymmetric construction. The broader side differs from the narrower side usually by a longer shoulder or, as shown here, by the cylindrical transition portion 2, extending annularly as between shoulder radius and shoulder. That cylindrical portion is the point or region of welding the wheel disk to the rim.

As a consequence, the rim 1 is impeded from undergoing deformation. The narrower side (1a) of rim 1 is supported directly by the dropped base by ring type joint action; the broader side (1b) of the rim element 1 bears on the wheel disk itself (through periphery 4). The combination of these features prevents axial and radial deformation of rim 1 in optimized fashion. Turning the rim flanges 6 almost radially inwardly (by more than 100°), toward the wheel axis, results in considerable enhancement of stability and distributes any tendency for deformation.

As the annular portion 4 of the disk has cylindrical contour and matches the cylindrical configuration transition portion 2, rim 1 and wheel disk 3 are readily centered to each other. That inherent centering, in turn, improves truth of rotation and planarity thereof. Also, the fact that the two parts 2 and 4 are cylindrical serves as added advantage for varying the relative axial portion of wheel 3 and rim, i.e., wheel 3 can be inserted more or less into the rim 1 as is deemed necessary.

As can be seen from the drawing, the space available for accommodating a break drum or the like is quite considerable. A break drum has almost the entire width of the rim available and extends close to the axial side wall portion of the wheel disk 3, which is also close to the bottom of base 8 of rim 1.

As can be seen from the drawing, there are two welding seams, which have been produced by arc welding. There is one seam at the end of annulus 4, adjacent the inner surface of transition part 2; there is another seam at the line of divergence (7 and 5). Instead of arc welding, spot welding or roller seam welding can also be employed, particularly for wheels of relatively small dimensions.

The overall stability of the wheel is considerably improved, so that the sheet stock used for the several parts may be thinner for similar load conditions the wheel is expected to experience. Accordingly, the wheel is lighter but has higher load and carrying capacity as compared with similarly light wheels but of known construction.

The invention is not limited to the embodiments described above but all changes and modifications thereof not constituting departures from the spirit and scope of the invention are intended to be included.

I claim:

1. Wheel for vehicles having a rim element and a dis-shaped wheel disk, the rim being of asymmetrical construction with one narrower and one broader side relative to a dropped base, the broader side having a substantially cylindrical portion, the rim element having flanges bent toward the axis of the wheel;

the wheel disk having a main dish-shaped portion and a peripheral portion of cylindrical configuration that extends axially and has larger diameter than the main dish-shaped portion, the peripheral portion being radially supported on the dish by a crimped portion extending radially outwardly from the substantially axially portion of the wheel dish, and merging again axially with said peripheral portion, said peripheral portion matching said cylindrical portion of said rim element in cylindrical, contour fitting configuration therewith, and being welded thereto, the crimped portion being the radial support of the peripheral portion of the dish and of the cylindrical portion of the rim as welded thereto.

* * * * *